United States Patent [19]

Chevallier

[11] Patent Number: 4,708,859
[45] Date of Patent: Nov. 24, 1987

[54] SILICA WITH A HIGH OIL ABSORPTION CAPABILITY AND A CONTROLLED PRIMARY STRUCTURE AND PROCESS FOR THE PRODUCTION THEREOF

[75] Inventor: Yvonick Chevallier, Decines, France

[73] Assignee: Rhone-Poulenc Chimie, France

[21] Appl. No.: 879,492

[22] Filed: Jun. 24, 1986

Related U.S. Application Data

[63] Continuation of Ser. No. 753,874, Jul. 11, 1985, abandoned.

[30] Foreign Application Priority Data

Jul. 11, 1984 [FR] France ................. 84 11004

[51] Int. Cl.$^4$ ................. C01B 33/18; C01B 33/12
[52] U.S. Cl. ........................... 423/339; 423/335
[58] Field of Search ................. 423/335, 339

[56] References Cited

U.S. PATENT DOCUMENTS

| | | | |
|---|---|---|---|
| 2,466,842 | 4/1949 | Elston | 252/313 |
| 2,577,485 | 12/1951 | Rule | 252/313 |
| 2,871,099 | 1/1959 | Ziese | 23/182 |
| 2,956,957 | 10/1960 | Armstrong et al. | 252/313 |
| 3,337,299 | 8/1967 | Burke, Jr. | 23/182 |
| 3,480,390 | 11/1969 | Reinhardt et al. | 23/182 |
| 3,954,944 | 10/1976 | Aldcroft et al. | 423/339 |
| 4,127,641 | 11/1978 | Aldcroft et al. | 423/339 |
| 4,144,321 | 3/1979 | Wason | 423/339 |
| 4,191,742 | 3/1980 | Wason et al. | 423/339 |
| 4,356,107 | 10/1982 | Payne | 252/313 S |
| 4,590,052 | 5/1986 | Chevallier et al. | 423/339 |

Primary Examiner—John Doll
Assistant Examiner—Lori S. Freeman
Attorney, Agent, or Firm—Finnegan, Henderson, Farabow Garrett & Dunner

[57] ABSTRACT

Precipitation silicas, in the form of aggregates as shown in FIG. 1, having a mean projected area of the aggregates which is higher than about 8,000 nm$^2$ and preferably is higher than about 15,000 nm$^2$. The present invention also concerns a process for the production of precipitation silica by maintaining a constant-volume reaction medium to provide a suitable colloids of silica, reacting the colloids with an electrolyte and consolidating the resulting product by the addition of a solution of silicate and an acidifying agent to obtain a precipitation silica.

15 Claims, 6 Drawing Figures

100nm

100nm

50nm

SILICA WITH A HIGH OIL ABSORPTION CAPABILITY AND A CONTROLLED PRIMARY STRUCTURE AND PROCESS FOR THE PRODUCTION THEREOF

This application is a continuation, of application Ser. No. 753,874, filed 7/11/85 now abandoned.

BACKGROUND OF THE INVENTION

1. Field of the Invention

The present invention provides a silica which can have a high oil absorption capability and a large primary structure. The invention also provides a process for the production of silica with these characteristics.

2. Description of Relevant Art

Precipitation of silica involves a complex array of phenomena involving a number of chemical reactions. Polycondensation and flocculation, which often compete with each other, are particularly important phenomena affecting the characteristics of precipitated silica.

Moreover, the term precipitated silica covers a product which is variable in its morphology. The ultimate particles or elementary pearls of a precipitated silica, for instance, may vary widely in size, shape, and other surface characteristics. Some of these morphological characteristics of silica may be detected with an electron microscope (See Ralph K. Iler "The Chemistry of Silica," John WILEY & Sons (1979), page 465 (hereafter, "Iler").

Variations in size of ultimate particles of silica may result in different degrees of association among the ultimate particles. As the particles group together, they form aggregates (See Iler, supra at page 476–477) and groups of weaker bonds, which results in a wide variety of morphologies of amorphous type silicas. The aggregates may be characterized in particular by their size, their form factor and their surface area.

Thus, there is not one silica but an infinity of silicas, the behavior of which cannot be foreseen, especially as surface chemistry is an important characteristic of silicas which significantly affects their chemical and physical properties.

When producing silicas, it is necessary to consider a large number of parameters affecting the characteristics of the final product, such as the levels of concentration of various reactants, pH value, reaction time, reaction temperature.

Attempts have long been made to isolate the various chemical reactions involved in the formation of silicas and their effect on the final product. U.S. Pat. No. 2,731,326, for instance, discloses first forming a sol by the addition of a solution of sulfuric acid to a silicate solution, then heating the sol in order to increase the size of the particles to about 5 to 7 nm. After particles are formed, a solution of acid and a solution of silicate are simultaneously added, at a constant pH value, to provide for precipitation and to deposit the remainder of the silica on the precipitate (See Iler, supra at page 558).

Similarly, U.S. Pat. Nos. 3,954,944 and 4,127,641 provide for adding simultaneously sulfuric acid and a solution of silicate to an aqueous heel to provide a sol, maturing the sol, flocculating the sol with the introduction of an alkaline electrolyte, maturing the flocculation product and further adding acid alone or acid and silicate.

It should be understood that the methods of producing silicas are complicated and that the properties of the products themselves are still difficult to appreciate. These problems make it difficult to discern how various production parameters affect the characteristics of the final product. Thus, in spite of substantial efforts which have been made over a long period of time, it has not been heretofore possible to provide a process which isolates the chemical reactions involved in the production of silicas or to control them, even at the level of the starting col- loid.

SUMMARY OF THE INVENTION

The process of the present invention comprises:
(a) providing a colloid of silica by
(i) forming a reaction medium by simultaneously adding an acidifying agent and an alkaline silicate solution to a reaction vessel;
(ii) reacting the acidifying agent and the alkaline silicate solution; and
(iii) maintaining a constant volume of the reaction medium by continuously drawing off the reaction medium while additional reactants in a constant volume are added to the reaction medium;
(b) reacting at least a part of the colloid obtained in step (a) with an electrolyte; and
(c) consolidatinq the product of step (b) by adding a solution of silicate and an acidifying agent to obtain a precipitation silica.

DETAILED DESCRIPTION OF THE INVENTION

Figure 1:
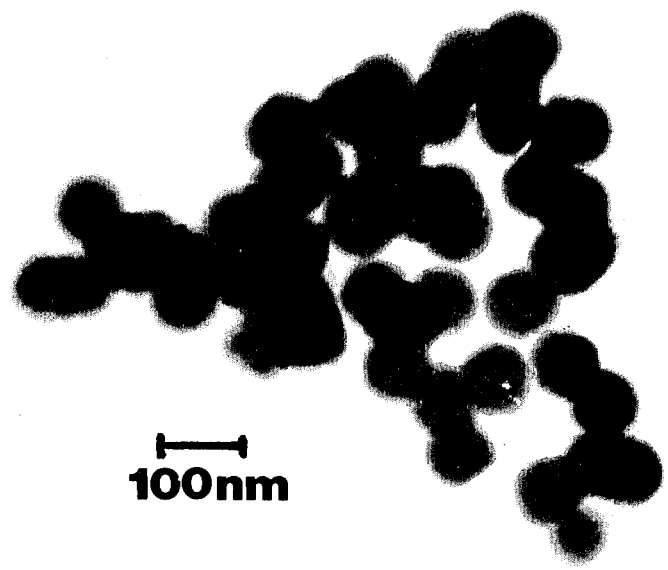
FIG. 1 is a photograph of aggregates formed in accordance with the present invention.

Step (a) of the process of the present invention preferably provides a substantially spherical colloid which is polydisperse with respect to diameter in the drawn off medium but which can be monodisperse in the reaction medium after the drawing-off operation begins. The process according to the invention, including step (a), therefore provides access to a large number of silicas according to the more or less polydisperse character, according to the mean diameter, of the colloid obtained by step (a). The term colloid will be used to denote sols which consist of fine particles, in accordance with the description of colloids given by Iler, supra, at page 415. Polydispersity, the ratio of the mean diameter by weight to the mean diameter by number, may be established with procedures well known to those of ordinary skill in the art, such as those described in K. J. MY- SELS, "Introduction to Colloid Chemistry", Interscience, New York (1959).

It will be appreciated that the characteristics of the colloid produced by step (a) of the process of the present invention depend on a number of parameters. Preferably, silica produced in accordance with the present invention is obtained by using a silicate with an $SiO_2/Na_2O$ weight ratio of from about 2 to 4. The concentration of silica in the colloid must be such as to avoid the agglomeration of the colloidal particles. The temperature of the reaction medium is preferably maintained from about 20° C. to 100° C., more preferably from about 50° to 100° C.

Another important factor in determining the morphological characteristics of silica is the residence time in the constant volume reaction medium. It has, in fact, been found that the diameter of the colloids depends to a large degree on the residence time.

Another important factor in determining the characteristics of the product silica is the duration of the reaction.

It has been found that a stable state with regard to the concentration of silica is established at the end of a certain period of time after the beginning of the drawing-off operation. When the stable state is reached, there is no longer any difference between the colloid in the reaction medium before it is drawn off and the colloid in the drawn-off reaction medium. After the stable state is reached, a polydisperse colloid is obtained in a continuous way, having balls which may be of very large size.

By step (a), it is possible to obtain monodisperse colloids with a spherical form factor, a mean diameter of between about 10 and 100 nm, and a polydispersity factor of from about 1 to 1.2 in the constant volume reaction medium, and also polydisperse colloids which are also of spherical form and have a mean diameter of from about 10 to 100 nm, but which have a polydispersity index which is preferably from about 1.2 to 4 in the substance drawn off. It will be appreciated that before the stable state is reached, the colloid in the reaction medium might be polydisperse. Such polydisperse colloid will, however, be more monodisperse, i.e. less polydisperse, than the colloid in the drawn-off reaction medium.

With the process of the present invention, it is also possible to obtain much higher ball sizes than has been possible with conventional processes. The larger balls of silica, which may reach sizes ranging up to about 300 nm, tend to undergo sedi- mentation.

With the present invention, it is possible to affect the colloid produced by step (a) in a number of ways. For instance, different fractions may be mixed together for the same residence time, or colloids obtained after different resident times may be combined.

In the present invention, step (b) is carried out on one or more of the fractions of colloid produced and present in the constant reaction volume in step (a) and/or of colloid contained in the portion of the reaction medium which is drawn off from the reaction vessel in step (a), before or after the stable state of the reaction in step (a) has been reached.

The electrolyte added in step (b) may be any type, but is preferably a metal salt such as an alkali or alkaline-earth metal. It will be appreciated, however, that use of a different metal salt, such as a rare-earth metal salt, would be within the scope of the present invention.

Step (b) is preferably performed at a pH value of from about 6 to 10, with a silica concentration of from about 20 to 100 g/l and at a temperature of from about 20° to 100° C.

Step (c) is advantageously carried out by the simultaneous addition of a solution of silicate and acidifying agent and by maintaining a constant pH value of from about 6 to 10, and a temperature of from about 50° to 100° C.

The suspension of silica produced at the end of step (c) is filtered, washed and dried. An advantageous method of drying comprises carrying out a process in accordance with French patent application No. 2 257 326 which provides forming a symmetrical axial spinning flow configuration with a hot gas having a large momentum, and introducing the suspension to be dried along the axis of symmetry of rotation of said flow configuration in the region of said flow configuration which is a relative depression. The momentum of the symmetrical axial spinning flow configuration, with respect to the axial flow of the suspension, is sufficient to cause the silica to be broken down, dispersed, taken over and dried.

The process of the present invention provides novel silicas. For a given value of specific surface area, these novel silicas can have unexpectedly high values of oil absorption and of mean projected area of the aggregate.

Thus, the present invention includes silicas in the form of aggregates with a mean diameter by number (dn) of elementary balls of from about 10 to 100 nm and with a mean projected area by number of the aggregate, expressed in $nm^2$, of higher than about 8,000 $nm^2$, preferably higher than about 15,000 $nm^2$ and more preferably from about 20,000 $nm^2$ to 100,000 $nm^2$.

In particular, the invention relates to silicas having a high inter-aggregate pore volume, preferably of about 1 $cm^3/g$ or higher, with a homogenous inter-aggregate pore population.

The specific surface areas and the oil absorption values may vary widely for the same types of silica, but it is possible in particular to produce silicas with a CTAB specific surface area of from about 20 to 120 $m^2/g$, with an oil absorption value of from about 250 to 500 ml/100 g, and a projected area in respect of the aggregates of greater than 8,000 and preferably greater than 15,000 $nm^2$.

Finally, it is possible to observe apparent densities from about 0.05 to 0.25 $g/cm^3$ for silicas produced in accordance with the present invention.

It will be appreciated that the present invention is not limited to the silicas which have just been described and it is possible in particular to obtain silicas having larger elementary balls.

The CTAB surface area is the external surface area as evaluated by absorption of cetyl trimethyl ammonium bromide with a pH value of 9 using the method disclosed by Jay, Jansen and C. Kraus in "Rubber Chemistry and Technology" 44 (1971), pp. 1287–1296. The disclosure of this reference is incorporated herein by reference Specific volume Vo is determined in the following fashion:

using a die with an inside diameter of 25 mm and a height of 80 mm, 3 g of silica is added, then placed thereabove is a piston to which a given weight is added so as to apply a pressure of $4 \times 10^5$ Pa to the silica. The specific volume of the silica is then measured, being the volume "Vo" expressed in cm$^3$/g (initial volume).

Oil absorption is evaluated using the method described in the French Standard NF.T 30-022 (March 1953), using dibutyl phthalate as the oil, on 5 g of silica.

The pH value is measured in accordance with the standard DIN 53200, the tapped apparent density corresponds to the standard NF.A 95-112, and apparent density is also indicated as measured without compacting.

Polydispersity of the elementary particles is the ratio of the mean diameter by weight (dw) to the mean diameter by number (dn). The mean diameters are calculated as stated by Joseph T. Bailey et al, "Average Quantities in Colloid Science", Journal of Chemical Education, Vol. 39, No. 4, April 1962, pp. 196-200. The disclosure of this reference is incorporated herein by reference.

The mean area of the aggregate was determined in accordance with the standard ASTM D 3849-80, adapted to the specific character of silica by disagglomerating the silica by crushing a paste formed by 100 mg of dry silica powder in 0.5 ml of glycerin and then diluting that paste in 300 ml of water, with a pH value of 3.

The operations of determining the inter-aggregate pore volume and determining the population of pores corresponding to that volume are carried out by means of a mercury porosimeter (porosimeter used: pore sizer 9300 from Coultronics). Mercury is caused to penetrate into the pores of the degassed sample, thereby establishing a porosity curve representing the variation in the volume of the pores in dependence on the pressure on the radius of the pores. The porosity curve is established using the method disclosed by N. M. Winslow and J. J. Shapiro in ASTM Bulletin, p. 39, February 1959. The disclosure of this Bulletin is incorporated herein by reference.

Piling up the aggregates gives rise to an inter-aggregate porosity, the filling of which with the mercury will be revealed by the appearance of a step on the porosity curve. The height of the step makes it possible to arrive at the inter-aggregate pore volume. The inclination of the step reflects the dispersion or scatter in the population of the pores. The derived curve has a peak configuration, the degree of fineness of which is in direct proportion to increasing homogeneity in regard to the population of the inter-aggregate pores.

Silicas made in accordance with the present invention are preferably used as strengthening fillers or as thickening agents.

The present invention will be more readily appreciated by reference to the following examples which illustrate the invention but do not limit it in any way.

In all the examples, the drying operation is carried out by means of an apparatus producing a symmetrical axial spinning flow configuration, in accordance with French Patent Application No.2 257 326, and utilizing a gas at a temperature of 500° C. at the intake and 150° C. at the outlet.

EXAMPLE 1

The first reaction stage consists of the preparation of a monodisperse silica sol with a mean diameter by number of 62 nm.

For that purpose, use is made of a reaction vessel with a volume of 20 liters, provided with a double jacket heating system and a system for agitation by means of a turbine-type agitator. The reactor comprises a system for continuous evacuation of a reaction medium as soon as the volume of liquid reaches a fixed value. An array of metering pumps is provided for the feed of the reactants. Those of ordinary skill in the art are familiar with the arrangement, operation and use of such metering pumps.

Eight liters of distilled water are introduced into the reactor and the temperature is raised to 90° C. The turbine agitator is operated at a speed of rotation of 400 rpm, and the following are simultaneously introduced:

a dilute aqueous sodium silicate solution (ratio by weight: $SiO_2/Na_2O=3.25$; $[SiO_2]=40$ g/l), at a rate of 67 ml per minute, and an aqueous solution of sulfuric acid ($[H_2SO_4]=17$ g/l) at a rate of 67 ml per minute.

The acid is introduced at a point which is clearly separate from the point at which the silicate solution is introduced. After the two reactants have been simultaneously introduced for a period of 10 minutes, the drawing-off operation is started to maintain a substantially constant volume in the reactor (that is to say, 9.3 liters); in that way, a spherical silica colloid is formed and increased in size in the reactor.

Thus, the following are present at any time:

a spherical silica colloid which is monodisperse in respect of size of diameter is present in the reactor (colloid A) and a spherical silica colloid which is polydisperse with regard to size of mean diameter by number which is less than that of the colloid A (colloid B).

The characteristics of colloid A are as follows:

| | | Mean Diameter | |
| --- | --- | --- | --- |
| Time | [SiO$_2$] g/l | By number dn nm | By weight dw nm |
| 1 hr | 16.0 | 17.5 | 18.3 |
| 2 hrs | 16.2 | 22.2 | 22.6 |
| 3 hrs | 20.8 | 30.0 | 31.4 |
| 4 hrs | 21.6 | 38.3 | 39.3 |
| 5 hrs | 23.6 | 50.0 | 51.6 |
| 6 hrs | 23.5 | 62.1 | 62.9 |

Second Reaction Stage

Seven liters of the colloid in the reactor (dn=62.1 nm) are used to obtain the silica. The seven liters are maintained at a temperature of 90° C. and agitated at 400 rpm. Sulfuric acid ($[H_2SO_4]=34$ g/l) is added thereto at a rate of 22.6 ml/min, over a period of 5 minutes. Then, over a period of 2 minutes, 2.6 liters of aqueous solution of Na$_2$SO$_4$ containing 350 g per liter of Na$_2$SO$_4$ are introduced. The resulting mixture is left to age for a period of 10 minutes.

Third Reaction Stage

Introduced into the resulting mixture is an aqueous solution of sodium silicate (ratio by weight: $SiO_2/Na_2O=3.25$; $[SiO_2]=75$ g/l), at a rate of 25.1 ml per minute, for a period of 90 minutes.

Two minutes after the operation of introducing the silicate is begun, an aqueous solution of sulfuric acid ($[H_2SO_4]=34$ g/l is simultaneously introduced, at a rate of 22.6 ml per minute, for 88 minutes. Throughout the period for which the acid and the silicate are introduced at the same time, the pH value is maintained at 8.0 ±0.2 (measured at 90° C.) and the temperature is held at 90° C.

The procedure through stages 2 and 3 may be diagrammatically represented in the following fashion:

| Time (minutes) | 0 | 5 | 7 | 17 | 19 | 107 | 130 |
|---|---|---|---|---|---|---|---|
| Aqueous silicate (ml/min) | | | | | 25.1 | | |
| Dilute $H_2SO_4$ (ml/min) | 22.6 | | | | 26.0 | | |
| $Na_2SO_4$ Solution | | | 2.61 | | | | |
| Temperature °C. | 90° | | | | | | 90° |

The silica suspension obtained at the end of the reaction has a pH value of 3.5. The suspension is filtered, washed and dried.

The characteristics of the dried silica are as follows:

| | |
|---|---|
| CTAB specific surface area | 23 m²/g |
| BET specific surface area | 30 m²/g |
| pH value with 5% in water | 6.9 |
| Vo | 3.64 cm³/g |
| DBP oil absorption | 300 ml/100 g silica |
| Apparent density | 0.19 g/cm³ |
| Tapped apparent density | 0.23 g/cm³ |

In the silica aggregates, the spherical elementary particle is clearly defined and monodisperse as shown in FIG. 1.

The mean projected area of the aggregates is 87,000 nm².

EXAMPLE 2

A silica having the following characteristics is prepared, at the conclusion of a 3-stage reaction:

| | |
|---|---|
| CTAB specific surface area | 89 cm²/g |
| BET specific surface area | 109 cm²/g |
| Vo | 4.9 cm³/g |
| DBP oil absorption | 492 ml/100 g silica |
| Apparent density | 0.072 g/cm³ |
| Tapped apparent density | 0.085 g/cm³ |
| pH value | 7.2 |

The mean projected area by number of the aggregates is 12,000 nm². The spherical elementary particles which are to be found in the aggregates have a mean diameter by number of 27 nm and a polydispersity index of 1.16.

First Reaction Stage

The first stage comprises preparing a polydisperse spherical silica colloid, with diameters ranging between 15 and 50 nanometers, with a mean diameter by number of 26 nanometers.

This colloid is prepared as described in the first reaction stage of Example 1, but with the following alterations in the reaction conditions:

the reaction is carried out at 78° C.±1° C., instead of 90° C., and the drawing-off operation is commenced as from the 25th minute after the beginning of the operation of simultaneously adding aqueous sulfuric acid and aqueous sodium silicate so that the liquid volume in the reactor is maintained constant at 11.3 liters.

The reaction liquid which is drawn off between 2 hours and 30 minutes and 5 hours 30 minutes is collected. Examination by a transmission-type electron microscope and examination by light diffusion show that it is a spherical silica colloid in polydisperse condition with diameters ranging from 15 to 55 nanometers. The silica concentration is 18 g of $SiO_2$ per liter.

Second Reaction Stage

Taking a 20 liter reaction as described in Example 1, a portion (8 liters) of the reaction liquid collected by being drawn off between 2 hours 30 minutes and 5 hours 30 minutes is introduced thereinto. The colloid is raised to 90° C. in a 20 liter reactor. An aqueous solution of $Na_2SO_4$ is then added to give an aqueous suspension of silica containing 0.37 mole per liter of $Na_2SO_4$. The mixture is allowed to age, in an agitated condition, for a period of 10 minutes.

Third Reaction Stage

Simultaneously introduced into the resulting suspension which is maintained in an agitated condition at 90° C., over a period of 60 minutes are aqueous sodium silicate ($[SiO_2]=40$ g/l; ratio by weight $SiO_2/Na_2O)=3.25$) at a mean flow rate of 40 ml/minute, and dilute aqueous sulfuric acid ($[H_2SO_4]=17$ g/l), at a mean rate of 40 ml per minute.

At the end of the reaction, the pH value of the slurry is adjusted to 3.5 with dilute sulfuric acid. After filtration, washing and drying, the silica whose characteristics were set out above is obtained.

EXAMPLE 3

A silica having the following characteristics is obtained at the conclusion of a 3-stage process:

| | |
|---|---|
| CTAB surface area | 103 m²/g |
| BET surface area | 120 m²/g |

Transmission-type electron microscope (T.E.M.) investigation reveals that the primary structure comprises aggregates of clearly defined elementary balls with a mean diameter by number of 27 nm and a polydispersity index of 1.04.

| | |
|---|---|
| DPB oil absorption | 460 ml/100 g |
| Vo | 4.71 cm³/g |
| pH value | 5.2 |
| Apparent density | 0.070 g/cm³ |
| Tapped apparent density | 0.084 g/cm³ |

A colloid is formed and grown as indicated in Example 1 in respect of colloid A. The operation of drawing off reaction medium is begun 3 minutes after the commencement of the operation of simultaneously introducing the two reactants. After two and a half hours, the reactor (20 liters) contains a colloid (8 liters) of silica with a mean diameter dn of 25 nm ($[SiO_2]=20$ g/l). Introduced into the colloid at 90° C. is sodium sulphate to give an aqueous mixture of 0.37 mole per liter of $Na_2SO_4$. The mixture is then allowed to mellow, with agitation, for a period of 65 minutes. Acid and silicate, which are diluted, in accordance with Example 2, are then added to the resulting mixture by simultaneous addition over 60 minutes. The silica whose characteristics are set out above is thus obtained.

EXAMPLE 4

A colloid is formed and grown as set forth in Example 1 with respect to colloid A. The drawing-off operation is started 3 minutes after the commencement of the reactant feed. After two and a half hours, the reactor (volume of 20 liters) contains a colloid of silica with a mean diameter by number of 27 nm ($[SiO_2]=20$ gl$^{-1}$). Taking that silica suspension (8 liters) which is held at 90° C., 3 liters of aqueous solution containing 1070 g of Na$_2$SO$_4$ are then added over 3 minutes. The mixture is then mellowed for a period of 10 minutes, with agitation, followed by the simultaneous addition (for a period of 60 minutes) of sulfuric acid in dilute form and sodium silicate in dilute form with the concentration and ratios of reactants and under the conditions specified in Example 2. The characteristics of the silica powder obtained after filtration, washing and drying are as follows:

| | |
|---|---|
| BET surface area | 111 m$^2$/g |
| CTAB surface area | 107 m$^2$/g |
| Specific volume under 4 × 10$^5$ Pa | 4.8 cm$^3$/g |
| DBP oil absorption | 465 ml/100 g of silica |
| pH value | 6.5 |
| Apparent density | 0.058 g/cm$^3$ |
| Tapped apparent density | 0.067 g/cm$^3$ |

T.E.M. investigation and image analysis reveal that the silica has aggregates whose characteristics fall between a low structure carbon black N 326 and a high structure carbon black N 347.

| PRODUCT | Mean Diameter (by number) of the Elementary Balls | Mean Projected Area (by number) of the aggregates in nm$^2$ |
|---|---|---|
| N 326 | 26 nm | 18 000 |
| N 347 | 25 nm | 26 000 |
| Silica | 27 nm | 22 000 |

EXAMPLE 5

A spherical colloidal silica suspension (mean diameter dn=24 nm) containing 36 g/l of silica is prepared. That colloid is formed in 2 hours 30 minutes as described in Example 1 (first reaction stage) but using reactants which are twice as concentrated and operating at 80° C. Na$_2$SO$_4$ is then added to give a salt concentration of 0.37 mole per liter of suspension. After aging for 65 minutes, acid and aqueous sodium silicate are simultaneously added, with a pH value of 9, at 90° C. for a period of 60 minutes.

At the end of the reaction, dilute sulfuric acid is added to lower the pH of the slurry to 3.5.

The characteristics of the silica obtained after filtration, washing and drying are as follows:

| | |
|---|---|
| CTAB specific surface area | 90 m$^2$/g |
| BET specific surface area | 120 m$^2$/g |
| Vo | 4.52 cm$^3$/g |
| DBP oil absorption | 420 ml/100 g of silica |
| Apparent density | 0.083 g/cm$^3$ |
| Tapped apparent density | 0.098 g/cm$^3$ |
| pH value | 6.1 |

Transmission-type electron microscope investigation reveals that the primary structure is formed by aggregates of clearly defined elementary balls of silica, with a mean projected area by number of the aggregates of 12,000 nm$^2$. The inter-aggregate pore volume which is ascertained by porosity with respect to mercury is 1.1 cm$^3$/g.

EXAMPLE 6

First Reaction Stage

The first reaction stage comprises the formation of a spherical silica colloid with a histogram with respect to diameters which extends between 12 and 60 nm, with a mean diameter by number (dn) of 31 nm, a mean diameter by weight (dw) of 44 nm and a polydispersity index (dn/dw) of 1.40.

Operation is effected as in the first reaction stage of Example 1, but the interest is in the colloid which is drawn off from the reaction medium. Thus the whole of the sol which is drawn off in 2 hours and 15 minutes from the commencement of the drawing-off operation is combined, giving 20 liters of colloidal suspension identified as fraction I. The whole of the colloid which is drawn off between 2 hours 15 minutes and 4 hours 30 minutes is then combined and identified as fraction II. Nine and fifteen one hundredth (9.15) liters of fraction I and 0.85 liter of fraction II are then mixed, thus giving 10 liters of colloidal silica suspension which is found to have the foregoing characteristics by investigation by means of a transmission-type electron microscope.

Second Reaction Stage

The 10 liters of colloid are heated to 90° C. in a 20 liter reactor. Sulfuric acid ([H$_2$SO$_4$]=34 g/l) is then added over a period of 6 minutes 30 seconds to the above-mentioned suspension which is maintained at 90° C. and agitated (400 rpm), to adjust the pH value from 9 to 8. A 1.76 liter aqueous solution of Na$_2$SO$_4$, containing 350 g of Na$_2$SO$_4$ per liter, is introduced over a period of one minute. The resulting mixture is left to age for 10 minutues and 30 seconds, with agitation.

Third Reaction Stage

An aqueous solution of sodium silicate (ratio by weight: SiO$_2$/Na$_2$O=3.25; [SiO$_2$]=75 g/l) is introduced at a rate of 27.5 ml/min, for a period of 100 minutes.

Two minutes 30 seconds after the silicate introduction operation begins, an aqueous solution of sulfuric acid ([H$_2$SO$_4$]=34 g/l) is simultaneously introduced at a rate of 30.1 ml/min for 97 minutes 30 seconds. Throughout the period for which the acid and the aqueous silicate are introduced at the same time, the pH value is maintained at 8±0.1 and the temperature is held at 90° C. After the silicate feed is stopped, the introduction of acid is continued for 12 minutes to give a pH value of 3.5.

The procedure through stages 2 and 3 may be diagrammatically represented in the following manner:

| TIME | 0 | 6'30" | 7'30" | 18 | 20'30" | 118' | 130' |
|---|---|---|---|---|---|---|---|
| SILICATE (ml/min) | | | | | 27.5 | | |
| ACID (ml/min) | | | | | 30.1 | | |
| Na$_2$SO$_4$ (350 g/l) | | | | | | | |
| pH value | 9 | 8  1.76 | 7.6 | 7.6 | 8.1 | 8.0  7.9 | 3.5 |
| T °C. | 90° | | | | | 90° | |

The silica suspension obtained at the end of the precipitation step is filtered, washed and dried.
The characteristics of the dried silica are as follows:

| | |
|---|---|
| CTAB surface area | 47 m$^2$/g |
| BET surface area | 58 m$^2$/g |
| pH value | 6.6 |
| DBP oil absorption | 378 ml/100 g of silica |
| Apparent density | 0.11 g/cm$^3$ |
| Tapped apparent density | 0.135 g/cm$^3$ |

Characterization by means of an electron microscope quantified by image analysis of the aggregates gives the following characteristics:

mean diameter by number (dn) of the elementary balls present in the aggregates: 36 nm, mean diameter by weight (dw) of the elementary balls: 50 nm, polydispersity index dw/dn = 1.4, and mean projected area by number of the aggregates: 15,000 nm$^2$.

Figure 2:
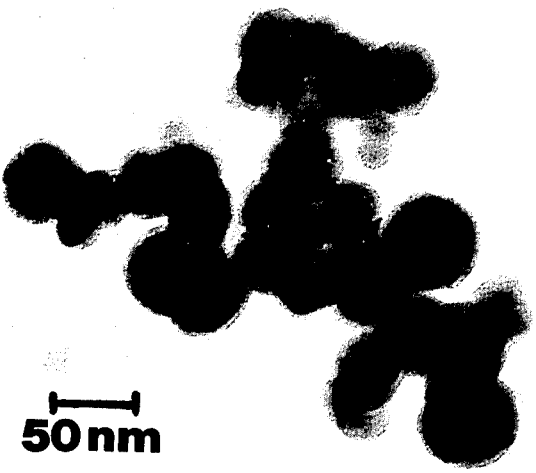
FIG. 2 is a photograph of aggregates formed in accordance with the present invention.

The appearance of the aggregates is as shown in FIG. 2.

EXAMPLE 7

A silica colloid is formed and grown, as set forth in Example 1, with respect to colloid A.

The drawing-off operation is begun 2 minutes after the commencement of the feed of the two reactants, the reactant feed being such as to maintain a pH value of 9±0.1 at 90° C. After 2 hours 30 minutes, the reactor (20 liters) contains a colloid (volume = 8 liters) of silica with a mean diameter by number of 28 nm.

Two liters of the colloidal suspension are drawn off. 2.25 liters of an aqueous solution containing 551.3 g of Na$_2$SO$_4$ are added to the colloidal suspension remaining in the reactor. This introduction is effected with agitation over a period of 2 minutes. The resulting suspension is then maintained in an agitated condition for a further period of 10 minutes, followed by the simultaneous addition (over a period of 75 minutes) of dilute sulfuric acid ([H$_2$SO$_4$] = 17 g/l) and dilute sodium silicate ([SiO$_2$] = 40 g/l).

The sodium silicate flow rate is maintained between 36 and 38 ml per minute. The dilute sulfuric acid flow rate is automatically controlled to give a pH value of 9±0.1 in the medium, at 90° C. After washing, filtration and drying, the resulting silica powder is of the following characteristics:

| | |
|---|---|
| CTAB surface area | 85 m$^2$/g |
| BET surface area | 80 m$^2$/g |
| Vo | 4.95 cm$^3$/g |
| DBP oil absorption | 406 ml/100 g of silica |
| Apparent density | 0.098 g/cm$^3$ |
| Tapped apparent density | 0.117 g/cm$^3$ |
| pH value | 5.2 |
| dn | 32 nm |
| dw | 34 nm |
| mean projected area by number of the aggregates | 14,000 nm$^2$ |

The inter-aggregate pore volume as determined by porosity with respect to mercury is 1.1 cm$^3$/g.

EXAMPLE 8

First Reaction Stage

This Example uses a 20 liter reactor provided with a double jacket heating system and a system for agitation by means of a turbine device. The reactor comprises a system for continuously removing a reaction liquid as soon as the volume of liquid reaches a fixed value. An array of metering pumps provides for the reactants feed.

Eight liters of water is introduced into the reactor and the temperature is raised to 90° C. The turbine agitator is operated at a speed of rotation of 400 rpm to agitate the mixture, and the following are simultaneously introduced into the liquid:

an aqueous solution of sodium silicate in dilute form (ratio by weight: SiO$_2$/Na$_2$O = 3.25; [SiO$_2$] = 20 g/l) at a rate of 120 ml per minute, and CO$_2$ at a rate which is automatically controlled at a value of the order of 44 g/hour so that the pH value is maintained at 9.1±0.1 at 90° C.

The CO$_2$ feed is at a separate point from the silicate solution feed.

About 2 minutes after the beginning of the simultaneous feed of the two reactants, the drawing-off operation is started to maintain a constant volume in the reactor. A spherical silica colloid is thus caused to form and grow in diameter in the reactor. After 2 hours 30 minutes, the feed of reactants into the reactor is stopped. The silica colloid present in the reactor has a mean diameter by number of 28 nm and a mean diameter by weight of 29 nm.

Second Reaction Stage

Taking the colloidal suspension obtained at the end of the first reaction stage, and maintaining the suspension at 90° C., 2 liters of aqueous solution (at 80° C.) containing 90 g of Na$_2$CO$_3$ and 286 g of NaHCO$_3$ are introduced over a period of 3 minutes. The suspension then undergoes aging for 9 minutes at 90° C., with agitation.

Third Reaction Stage

The following are introduced simultaneously into the aqueous suspension:

aqueous sodium silicate (ratio by weight: SiO$_2$/Na$_2$O = 3.25; [SiO$_2$] = 20 g/l), at a rate of 87 ml/min; and undiluted CO$_2$ at a rate which is automatically controlled to give a pH value of 8.7±0.1 (flow rate = 0.67 g/min).

The simultaneous introduction operation lasts for 60 minutes.

The silica suspension obtained at the close of the third reaction stage is filtered, washed and dried. The characteristics of the dried silica are as follows:

| CTAB surface area | 85 m²/g |
|---|---|
| BET surface area | 101 m²/g |
| pH value | 7.5 |
| DBP oil absorption | 386 ml/100 g of silica |
| Vo | 5.1 cm³/g |
| Apparent density | 0.071 g/cm³ |
| Tapped apparent density | 0.083 g/cm³ |

Electron microscope investigation of the aggregates reveals that they comprise balls of silica with a mean diameter by number of 29 nm.

EXAMPLE 9

A spherical colloid of silica which is monodisperse in respect of diameter is formed and grown, as set forth in Example 1, for colloid A, but with the following modification: the drawing-off operation is started 2 minutes after the commencement of the simultaneous introduction of dilute sulfuric acid and aqueous sodium silicate, such drawing operation being carried out in such a way that the pH value is held at 9±0.2 at 90° C. After 2 hours, 30 minutes, the reactor contains a monodisperse spherical colloid (volume=8 liters) of silica. The pH value is lowered to 8 with 300 ml of dilute $H_2SO_4$. Three liters of aqueous solution containing 1050 g of $Na_2SO_4$ are introduced into the above-mentioned colloidal suspension which is maintained with agitation at 90° C. The operation of introducing the 3 liters of aqueous solution is carried out over a period of 2 minutes and the resulting mixture is maintained with agitation (turbine agitator operating at 110 rpm) at a pH value of 8 at 90° C., over a period of 10 minutes.

Dilute sulfuric acid ($[H_2SO_4]$=17.1 g/l) and dilute sodium silicate (ratio by weight $SiO_2/Na_2O$=3.25; $[SiO_2]$=40 g/l) are simultaneously added (over a period of 65 minutes).

The sodium silicate flow rate is maintained at 37 ml per minute. The dilute sulfuric acid is automatically controlled so that the pH value in the reaction medium is maintained at 8±0.1 at 90° C.

The resulting silica slurry is then adjusted to a pH value of 3.5 by the addition of dilute sulfuric acid. After filtration, washing and drying, the silica powder produced has the following characteristics:

| CTAB surface area | 110 m²/g |
|---|---|
| BET surface area | 110 m²/g |
| Vo | 4.5 cm³/g |
| DBP oil absorption | 400 ml/100 g of silica |
| Apparent density | 0.054 g/cm³ |
| Tapped apparent density | 0.068 g/cm³ |
| pH Value | 6.9 |

In the case of a drying operation carried out in a drying oven (15 hours at 150° C.), a silica is obtained which has a lower level of oil absorption: 220 ml of DBP for 100 g of silica.

Figure 3:
FIG. 3 is a photograph of aggregates formed in accordance with the present invention.

Observation by means of a transmission-type electron microscope shows that the silica aggregates comprise elementary particles of spherical silica which are welded together and which are clearly defined, with a mean diameter of 25 nm. The polydispersity index is 1.04. The appearance of the aggregates is shown in FIG. 3.

Image analysis shows that the aggregates have a mean projected area of 27,000 nm².

Figure 4:
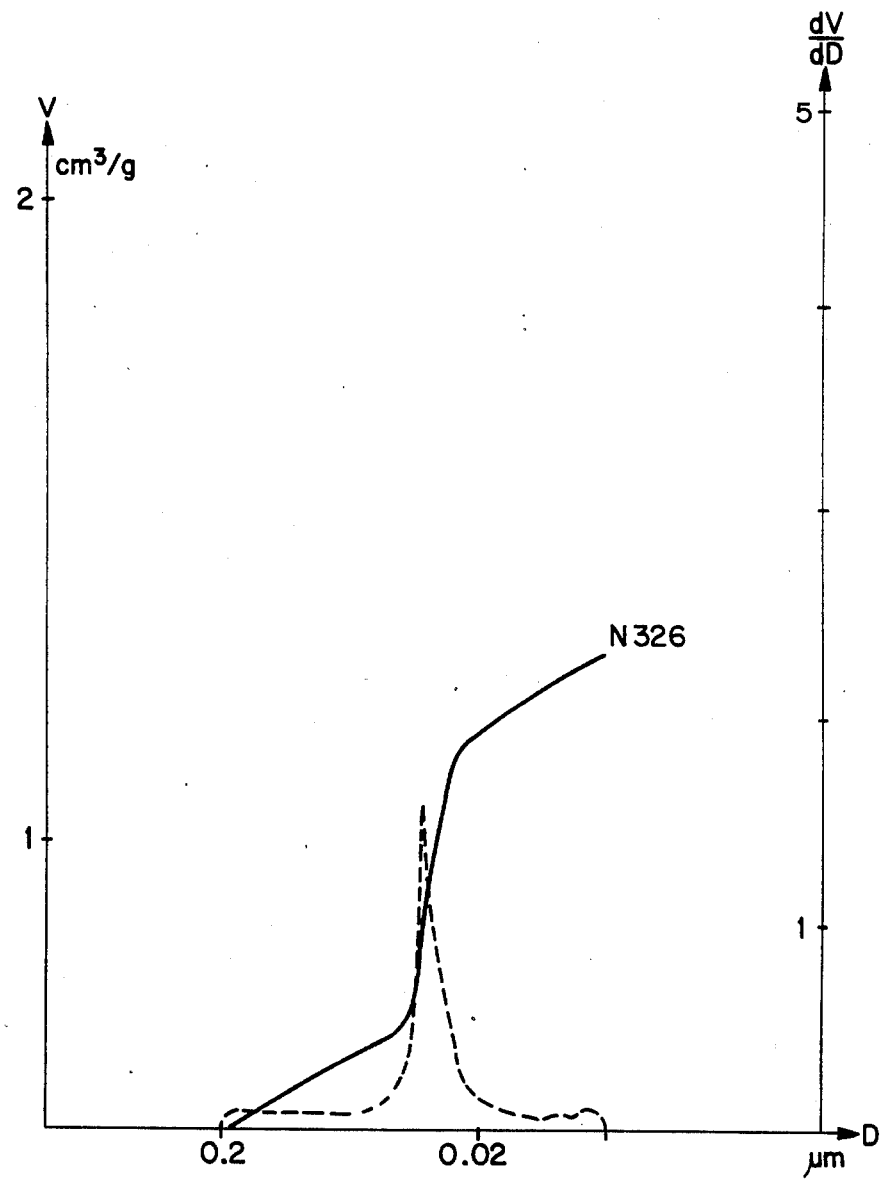
FIGS. 4 and 5 show curves of mercury absorption. These figures represent the evolution of cumulated volume V with respect to the diameter of pores D and their derivatives dV/dD for carbon black N 326 and N 347 (dotted lines).
Figure 5:
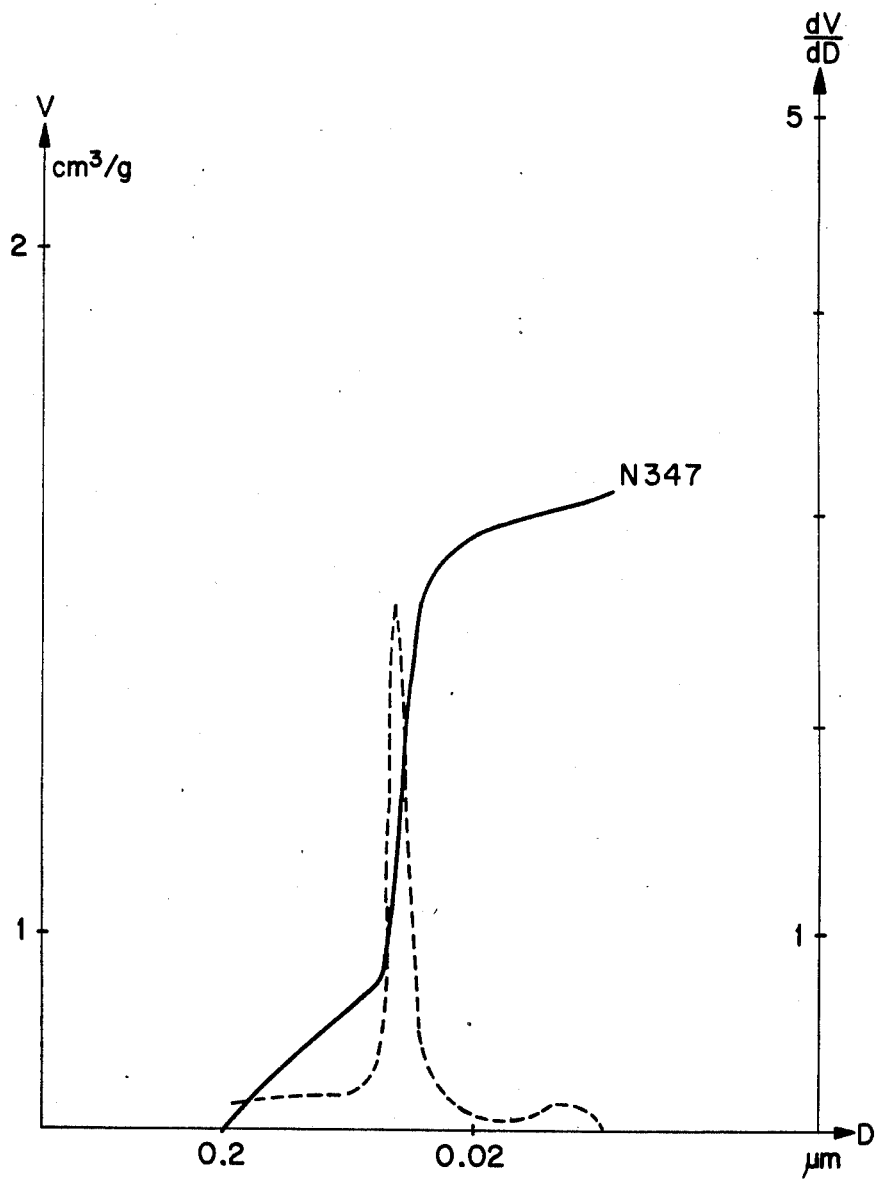
Figure 6:
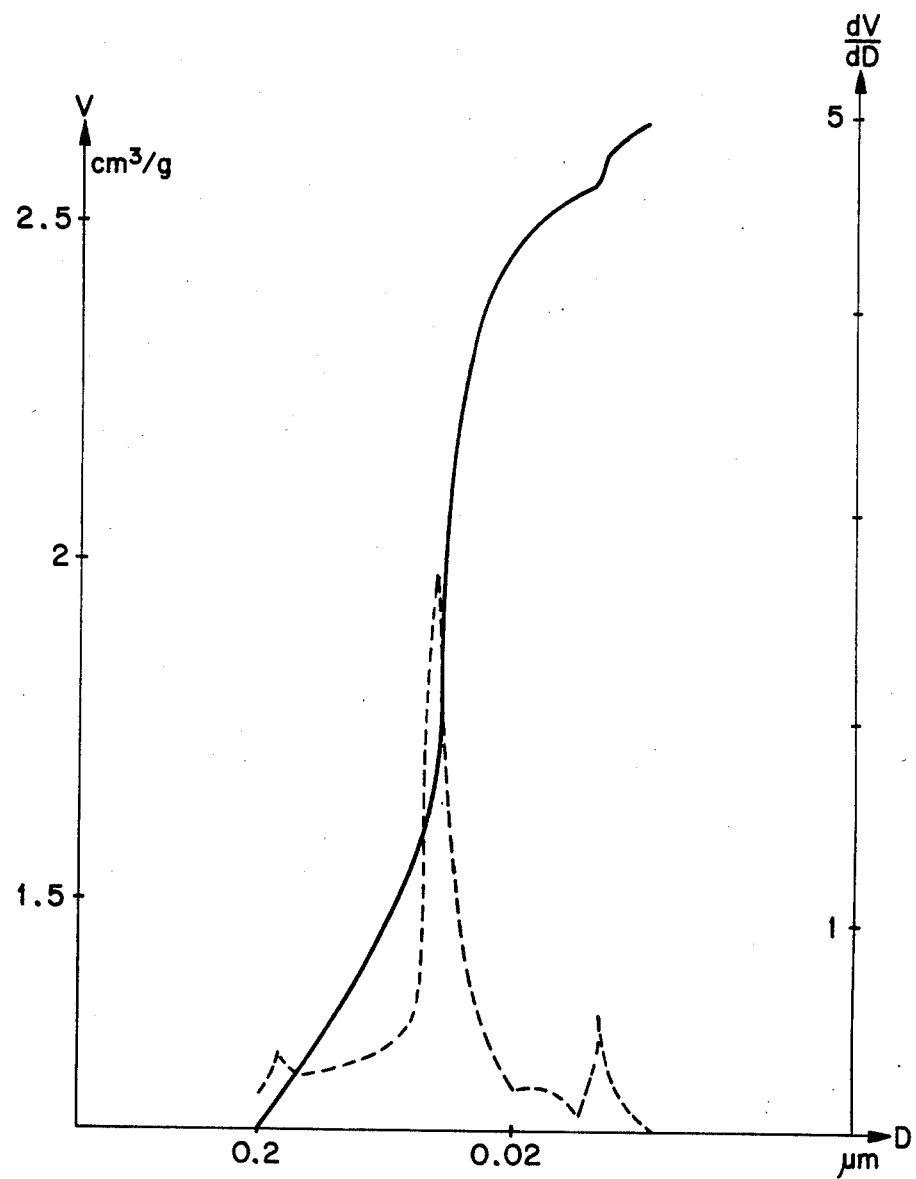
FIG. 6 illustrates the similarity in absorption curves for a silica produced in accordance with the present invention. The curve in solid line corresponds to the cumulated volume in V cm$^3$/g for silica produced in accordance with the present invention, while the curve in broken line corresponds to the derivative dV/dD from the former.

FIGS. 4, 5 and 6 show the porosity curves obtained with a mercury porosimeter with respect to carbon black N 326 and N 347, and with respect to the silicas prepared. Carbon black N 347 and N 326 are characterized by a highly homogeneous inter-aggregate pore population, which is revealed by a very narrow peak on the derivative of the curve (broken line curve). That characteristic is also to be perfectly found on the curve relating to the silica prepared in accordance with the invention. The silica has an inter-aggregate pore volume which is higher than that of carbon black N 347, while preserving substantially the same pore distribution.

The inter-aggregate pore volumes are as follows:

| Product | Pore Volume cm³/g |
|---|---|
| Silica according to the invention | 1.5 |
| N 347 | 1.0 |
| N 326 | 0.7 |

EXAMPLE 10

A precipitation silica is prepared by three successive operations which are carried out in the following manner:

the first stage is the formation of a monodisperse spherical silica colloid as indicated in Example 7, the second stage involves introducing into the colloidal solution present in the reactor, 291 g of NaCl in solution in 1 liter of water. That operation lasts for 2 minutes. The reaction mixture is then maintained at 90° C. with agitation for 10 minutes.

the third stage involves introducing into the reaction medium simultaneously, over a period of 90 minutes, aqueous sodium silicate (ratio by weight $SiO_2/Na_2O$=3.25; $[SiO_2]$=40 g/l) at a rate of 44 ml per minute, and dilute sulfuric acid ($[H_2SO_4]$=17 g/l) at a rate of 42.3 ml per minute, so controlled that the pH value of the silica suspension is 8.9±0.2 at 90° C. The resulting silica slurry is adjusted to a pH value of 3.5 by the addition of dilute sulfuric acid. After filtration, washing and drying, the characteristics of the silica obtained are as follows:

| CTAB specific surface area | 60 m²/g |
|---|---|
| BET specific surface area | 60 m²/g |
| pH value | 6.1 |
| DBP oil absorption | 380 ml for 100 g of silica |
| Apparent density | 0.106 g/cm³ |
| Tapped apparent density | 0.133 g/cm³ |

The mean projected area by number of the aggregates is 27,000 nm².

The spherical elementary particles present in the aggregates have a mean diameter by number of 33 nm and a polydispersity index of 1.05.

EXAMPLE 11

A precipitation silica is prepared by three successive reaction stages. The procedure followed is as described in Example 7, with the following differences:

the spherical silica colloidal solution is formed at the end of the first stage, and 3 liters of that solution is drawn off. Six hundred fifty seven grams of $Na_2SO_4$ in solution in 1.87 liters of water are introduced into the colloidal solution remaining in the reactor. The operation of introducing the $Na_2SO_4$ solution lasts for 2 minutes. The resulting suspension is maintained at 90° C. with agitation for a further period of 10 minutes.

That is followed by the simultaneous addition (for a period of 90 minutes) of aqueous sodium silicate ($[SiO_2]=40$ g/l), ratio by weight: $SiO_2/Na_2O=3.25$) at a rate of 52.5 ml minute with the rate being so controlled that the pH value of the reaction suspension is maintained at $8.9\pm0.1$.

The resulting silica slurry is adjusted to a pH value of 3.5 by the addition of dilute sulfuric acid.

After filtration, washing with water and drying by atomisation, the characteristics of the silica collected are as follows:

| | |
|---|---|
| CTAB surface area | 45 m²/g |
| BET surface area | 50 m²/g |
| DBP oil absorption | 310 ml for 100 g of silica |
| pH value | 6.3 |
| Vo | 4.34 cm³/g |
| Apparent density | 0.17 g/cm³ |
| Tapped apparent density | 0.20 g/cm³ |

The mean projected area by number of the aggregates is 29,000 nm².

The spherical particles present in the aggregates have a mean diameter by number of 40 nm and a polydispersity index of 1.04.

EXAMPLE 12

First Reaction Stage

Use is made of a reactor with a volume of 1 liter, provided with a heating system and a turbine-type agitator. Metering pumps provide for the feed of the reactants in two separated places. The reactor comprises a system for continuous evacuation of the reaction liquid to maintain the volume of the reaction product at a fixed value of 0.8 liter.

Eight tenths of a liter of water are introduced into the reactor and the temperature is raised to 75° C. The turbine agitator is operated at a speed of rotation of 1000 rpm and the following are simultaneously introduced:

an aqueous sodium silicate solution (ratio by weight $SiO_2/Na_2O=3.25$; $[SiO_2]=50$ g/l), at a rate of 22 ml per minute; and an aqueous solution of sulfuric acid ($[H_2SO_4]=22.8$ g) at a rate of 22 ml per minute.

After about 4 hours of reaction, a stable operating state is attained. The concentration of silica in the reactor and the characteristics of colloid obtained do not further vary with the time as indicated by examination by a transmission-type electron microscope and examination by light scattering of the obtained product, which are made by taking the substance at regular time between the 4th and the 100th hours.

The silica colloid obtained consists in spherical particles showing diameter sizes at all times situated in a range of 10 to 50 nm, with a mean diameter by number (dn) of 19 nm, and a mean diameter by weight (dw) of 33 nm.

The sol of colloid drawn-off and accumulated between the 4th and the 100th hours is used in the second reaction stage.

For the second and third reaction stages the reaction temperature is at 90° C. and the turbine agitation is operated at a speed of rotation of 110 rpm.

Second Reaction Stage

Three liters of an aqueous solution containing 450 g of $NaSO_4$ are introduced in the reactor of 20 l described in Example 1. The temperature is raised to 90° C.

Eight liters of the colloid obtained in stage one are introduced in the reactor under agitation (110 rpm), preheated at the temperature of 90° C. and brought to a pH of 8 by adding dilute sulfuric acid (350 ml of an aqueous solution containing 100 g of $H_2SO_4$ are introduced in ten minutes).

The colloid is added to the aqueous solution of $H_2SO_4$ over a period of 9 minutes. The resulting mixture is left to age for a period of 3 minutes under agitation (110 rpm).

Third Reaction Stage

Simultaneously introduced into the resulting mixture over a period of 70 minutes and maintained under agitation at 90° C. are:

an aqueous solution of sodium silicate containing 110 g of $SiO_2$ per liter of a weight ratio $SiO_2/Na_2O$ equal to 3.25; this solution is fed at a rate of 25 ml per minute; and an aqueous solution of sulfuric acid containing 100 g per liter of $H_2SO_4$; this solution is fed at a rate of 13.5 ml per minute.

After this period of 70 minutes of simultaneously adding of the two reactants (silicate+acid) the feeding of silicate is stopped. The introduction of dilute sulfuric acid is maintained over a period of 8 minutes at a rate of 25 ml per minute.

The silica slurry obtained at the end of the reaction has a pH value of 3.5.

It is filtered, washed and dried.

The characteristics of the dried powdered silica are as follows:

| | |
|---|---|
| BET specific surface area | 96 m²/g |
| CTAB specific surface area | 95 m²/g |
| pH value with 5% in water | 6.6 |
| DBP oil absorption | 260 ml/100 g of silica |
| Tapped apparent density | 0.17 g/cm³ |

Examination by a transmission-type electron microscope reveals aggregates of silica constituted of elementary spherical particles having a mean diameter in number of 26 nm and a polydispersity index of 2; the interaggregate pore volume is 1.15 cm3/g.

EXAMPLE 13

Carbon dioxide is added as acid reactant.

First Reaction Stage

This first stage comprises preparing a polydisperse colloid of silica in a continuous way in the same manner as in Example 12 but by using $CO_2$ as the acid reactant instead of $H_2SO_4$.

The colloid is prepared as described in the first reaction stage of Example 1, but with the following alterations in the reaction conditions:

the reaction is carried out at 72° C., the following are simultaneously introduced:

an aqueous sodium silicate solution (ratio by weight $SiO_2/Na_2O=3.25$; $[SiO_2]=25$ g/l at a rate of 67 ml per minute; and pure $CO_2$ in the gaseous state at a rate of 1.53 g per minute.

The product of reaction drawn off continuously between 40 minutes and 6 hours is accumulated.

This reaction product is a colloid of polydisperse silica: the spherical particles of silica have a mean diameter by number of 19 nm and a mean diameter by weight of 37 nm.

Second Reaction Stage

Into 20 liters of the colloid in the reactor, as described in Example 1, 3 liters of an aqueous solution containing 117 g of $Na_2CO_3$ and 277 g of $NaHCO_3$ are introduced.

The solution is raised to a temperature of 90° C.

Eight liters of the colloid obtained in stage 1 are heated to 90° C. and adjusted to a pH of 8.4 by introduction of 36 g of $CO_2$ in 30 minutes and are added to the above-described solution, which is maintained under agitation.

The introduction of this colloid into the aqueous solution of $Na_2CO_3 + NaHCO_3$ is carried out in 9 minutes. The mixture is allowed to age, in an agitated condition, for a period of 3 minutes.

Third Reaction Stage

Simultaneously introduced into the resulting suspension which is maintained in an agitated condition at 90° C., over a period of 70 minutes, are:

an aqueous solution of sodium silicate ($[SiO_2]$) = 75 g/l ratio by weight $SiO_2/Na_2O = 3.25$ at a mean flow rate of 36 ml per minute; and pure $CO_2$ in an aqueous state at a rate of 1.2 g per minute.

At the end of the reaction, the resulting slurry of silica is filtered. The resulting filter cake is washed with 4 liters of water. After spin drying the resulting product is diluted in 3 liters of water.

The resulting slurry is raised to 60° C.

The pH value of the slurry is adjusted to 4 with dilute sulfuric acid.

The resulting suspension is filtered, washed and dried.

A silica having the following characteristics is obtained:

| | |
|---|---|
| BET surface area | 130 m²/g |
| CTAB surface area | 82 m²/g |
| pH value | 6.8 |
| DBP oil absorption | 300 ml/100 g |
| Tapped apparent density | 0.128 g/cm³ |

T.E.M. investigation reveals that the primary structure comprises aggregates of spherical particles with a mean diameter by number of 25 nm and a polydispersity index of 1.8.

Mean projected area (by number) of the aggregates in $nm^2 = 30000$. Inter-aggregate pore volume = 1.10 cm³/g.

I claim:

1. A process for the production of precipitated silica comprising:
   (a) providing a colloid of silica by
      (i) forming a reaction medium by simultaneously adding an acidifying agent and an alkaline silicate solution to a reaction vessel;
      (ii) reacting said acidifying agent and said alkaline silicate solution; and
      (iii) maintaining a constant volume of said reaction medium by drawing off said reaction medium while adding additional acidifying agent and alkaline silicate solution in a constant volume to the reaction medium, wherein said alkaline silicate is added to said reaction medium to provide a silica concentration that avoids aqqlomeration of colloidal particles;
   (b) reacting at least a portion of the colloid obtained in step (a) with an electrolyte, said colloid having a mean diameter of between about 10 and 100 nm and a polydisperity factor of from about 1 to 4; and
   (c) consolidating the substance obtained in step (b) by adding a solution of silicate and an acidifying agent to obtain said precipitated silica with a CTAB specific surface area from about 20-120 m²/g.

2. A process as recited in claim 1 wherein said alkaline silicate solution is an aqueous sodium silicate having a ratio of $SiO_2/Na_2O$ of from about 2 to 4.

3. A process as recited in claim 2 wherein said reaction medium is maintained at a temperature from about 20° C. to 100° C. during step (a) and from about 50° C. to 100° C. during step (b) and a pH from about 6 to 10 during step (b).

4. A process as recited in claim 3 wherein said reaction medium during step (a) has a mean residence time in said reaction vessel from about 10 minutes to 3 hours and wherein said reaction medium is maintained at a temperature from about 75° C. to 90° C.

5. A process as recited in claim 3 wherein step (c) is conducted with the simultaneous addition of said solution of silicate and said acidifying agent.

6. A process as recited in claim 5 wherein said consolidation in step (c) is carried out at a constant pH of from about 6 to 10.

7. A process as recited in claim 6 wherein said consolidation in step (c) is carried out at a temperature from about 50° to 100° C.

8. A process as recited in claim 5 wherein said electrolyte is selected from the group consisting of alkali, alkaline-earth metal and rare-earth metal salts.

9. A process as recited in claim 8 wherein said electrolyte is a sodium salt.

10. A process according to claim 1 wherein the colloid in step (b) corresponds to one or more fractions of the colloid present in said reaction vessel.

11. A process according to claim 1 wherein the colloid in step (b) corresponds to one or more fractions of the colloid contained in the portion of the reaction medium drawn off from said reaction vessel.

12. A process according to claim 1 wherein the colloid in step (b) corresponds to a mixture of fractions of colloids present in said constant volume reaction medium and contained in the portion of the reaction medium drawn off from the reaction vessel.

13. A process according to claim 1 wherein the colloid in step (b) is obtained before a stable state is reached in said reaction medium.

14. A process according to claim 1 wherein the consolidating in step (b) is effected with an electrolyte selected from the group consisting of salts of alkali and alkaline-earth metals.

15. A process according to claim 1, further comprising a drying operation (d) effected after consolidation by forming a symmetrical axial spinning flow configuration with the hot gas, with a large momentum, and introducing a silica formed in step (c) along the axis of symmetry of rotation of said flow configuration such that the silica of step (c) is broken up, dispersed and dried.

* * * * *

UNITED STATES PATENT AND TRADEMARK OFFICE
CERTIFICATE OF CORRECTION

PATENT NO. : 4,708,859

DATED : November 24, 1987

INVENTOR(S) : Yvonick CHEVALLIER

It is certified that error appears in the above-identified patent and that said Letters Patent is hereby corrected as shown below:

In claim 1, column 18, line 4, change:

"aqqlomeration" to --agglomeration--

Signed and Sealed this

Tenth Day of May, 1988

Attest:

DONALD J. QUIGG

Attesting Officer

Commissioner of Patents and Trademarks